Oct. 6, 1953 — R. L. DEAL — 2,654,338
AUTOMATIC FISH SET
Filed June 15, 1951

INVENTOR
RAYMOND L. DEAL
BY Herman L. Gordon
ATTORNEY

Patented Oct. 6, 1953

2,654,338

UNITED STATES PATENT OFFICE 2,654,338

AUTOMATIC FISH SET

Raymond L. Deal, Hudson, Wis.

Application June 15, 1951, Serial No. 231,790

1 Claim. (Cl. 116—114)

This invention relates to fishing apparatus, and more particularly to a signalling device for use in fishing through ice, to provide a warning that a fish is biting.

A main object of the invention is to provide a novel and improved automatic signalling apparatus for ice fishing which is simple in construction, which may be readily set up for use, and which is substantially completely enclosed when set up for use, whereby it is protected from rain, sleet, snow, or other adverse weather conditions.

A further object of the invention is to provide an improved automatic signalling apparatus for use in fishing through ice to provide a warning that a fish is biting, said device being inexpensive to fabricate, involving only a few parts, being compact in size, and being sturdy in construction.

A still further object of the invention is to provide an improved automatic signalling device for ice fishing which will not freeze up when set up for use, which provides a highly visible indication when tripped, which is easy to reset, which is very sensitive, and which will function in all types of weather.

Further objects and advantages of the invention will become apparent from the following description and claim and from the accompanying drawings, wherein:

Figure 1:
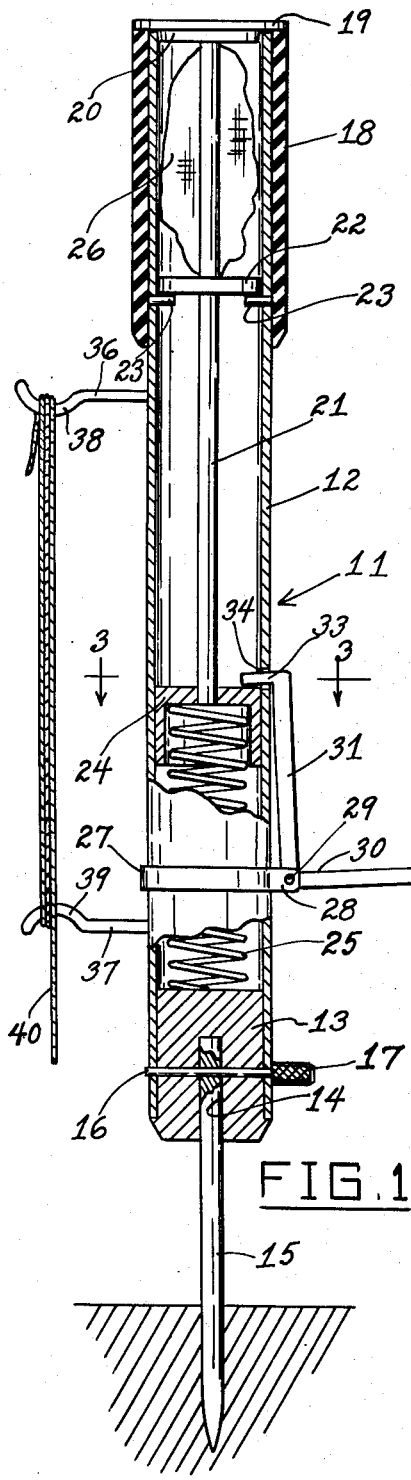
Figure 1 is a vertical cross-sectional view taken through an improved automatic signalling device for ice fishing constructed in accordance with the present invention, shown set up to provide a signal indicating that a fish is biting.

Referring to the drawings, the automatic signalling device is designated generally at 11 and comprises an elongated tubular main body 12 having a plug element 13 rigidly secured in its lower end, as shown in Figure 1. Plug element 13 is formed with a bore 14 adapted to receive the upper end portion of a metal stake rod 15. A removable transverse pin 16 extends through the sleeve 12, plug 13 and rod 15, as shown, locking the rod in the bore 14. Pin 16 has a knurled head 17 for the manual removal thereof when it is desired to detach the apparatus from the stake rod.

The top end portion of body 12 is provided with a rubber hand gripping sleeve 18, whose top edge may project slightly above the top edge of body 12 to provide a sealing means cooperating with a cover disc 19, as shown, effective to seal the upper end of body 12 when the device is set up for operation, as will be presently described.

Cover disc 19 includes a tapered inner portion 20, which is receivable inside the top of body 12, as shown in Figure 1. Said cover disc is axially secured to the top end of a rod member 21, which extends axially through the body 12 and is guided for axial movement in said body by a centrally apertured disc member 22 secured to a plurality of inwardly projecting pins 23 provided in the body 12 a substantial distance below the top end thereof. The rod member 21 extends slidably through the central aperture in disc 22. Secured to the lower end of rod member 21 is a downwardly facing cylindrical cup member 24, which is slidable in the tubular body 12. Designated at 25 is a coiled spring which is disposed in the lower portion of body 12. The lower end of spring 25 bears on the plug element 13 and the upper end of said spring bears inside the cup member 24, biasing said cup member and the rod member 21 upwardly. Secured to the upper portion of the rod member immediately below the cover disc 19 is the signal flag 26.

Secured tightly around the lower portion of body 12 is a rigid band 27, formed at its ends with the spaced parallel outwardly directed lug portions 28, 28 which are connected by a rivet 29. Rotatably mounted on rivet 29 between said lug portions 28, 28 is the bent lever 30 having the respective arms 31 and 32. Arm 31 is formed at its free end with a right-angled lug element 33 which is receivable through an aperture 34 in body 12 and is of sufficient length to overly the cup member 24, as shown in Figure 1, to releasably secure the cup member in the depressed position in body 12 shown in said figure. In this position the flag 26 is housed in the upper portion of body 12 and the disc 19 makes sealing contact with the top edge of the rubber handle sleeve 18.

Arm 32 is formed at its free end with an upwardly facing arcuate hook element 35. Arm 32 is at a substantial angle to arm 31, for example, at approximately an angle of 90 degrees, as shown.

The body 12 is provided with the spaced outwardly extending arms 36 and 37 formed with the opposed arcuate hook elements 38 and 39 around which a fishing line 40 may be coiled, as shown in Figure 1.

In using the device, a stake rod 15 is first driven into the ice adjacent the fishing opening and the apparatus is mounted on the stake rod as shown in Figure 1, said apparatus being secured to said stake rod by means of the pin 16.

Figure 2:
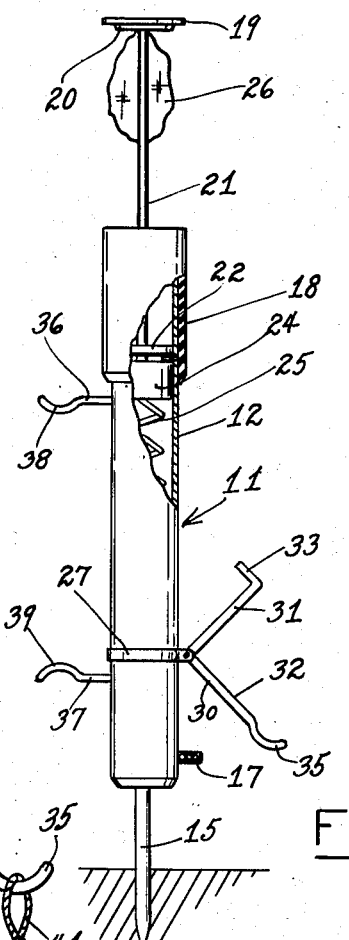
Figure 2 is a side elevational view, partly in cross-section, showing the positions of the parts of the device of Figure 1 after the device has been tripped.
Figure 3:
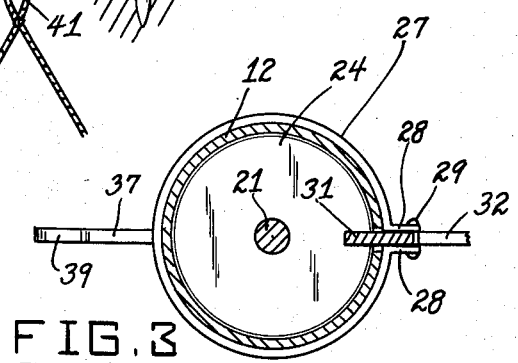
Figure 3 is an enlarged cross-sectional view taken on line 3—3 of Figure 1.

A loop 41 is tied in the fishing line and is engaged on the hook element 35. The line is lowered into the fishing opening, the loose portion of the line between loop 41 and that lowered into the fishing opening being disposed loosely on the ice and being of sufficient length to allow a fish to freely swallow the bait and become secured to the hook. The disc 19 is, of course, depressed into sealing engagement with the top edge of handle 18 and body 12, and the arm 31 is disposed in the position of Figure 1 wherein lug 33 locks cup member 24 against upward movement. When the line becomes taut, the arm 32 is pulled downwardly, rotating arm 31 outwardly and freeing cup member 24, whereby spring 25 elevates said cup member to the position of Figure 2, wherein said cup member engages the stop pins 23. The rod member 21 is thus elevated and raises the flag 26 out of body 12 to a readily visible position, as shown in Figure 2, indicating that a fish is biting. The device may be readily reset by depressing the cover disc member 19 to its sealing position and by engaging the lug 33 of locking arm 31 over the cup member 24, as in Figure 1.

It will be readily apparent that when the signal device is set as in Figure 1, the interior of body 12 is substantially completely closed off, preventing the entry of rain, sleet or snow therein, and preventing freezing of the internal movable parts of the device during the period prior to the catching of a fish.

While a specific embodiment of an automatic signal device for ice fishing has been disclosed in the foregoing description, it will be understood that various modifications within the spirit of the invention may occur to those skilled in the art. Therefore it is intended that no limitations be placed on the invention except as defined by the scope of the appended claim.

What is claimed is:

In an automatic signalling device for ice fishing, a rigid sleeve member, a plunger slidably mounted in said sleeve member, an upwardly extending plunger rod secured axially to said plunger, spring means biasing said plunger upwardly in said sleeve member, a flag element secured to the upper portion of said plunger rod and arranged to be exposed responsive to upward movement of the plunger, a sealing sleeve of deformable elastic material secured around the top portion of said sleeve member and projecting above the top edge of said sleeve member, a rigid cover member secured to said plunger rod above the flag element and having an integral annular marginal flange arranged to sealingly engage the top edge of said sealing sleeve when said plunger is in depressed position, a centrally apertured disc member secured in the upper portion of the sleeve member below the flag element and slidably receiving the plunger rod, said disc member being arranged to support the plunger rod for axial movement in the sleeve member and defining a barrier against the passage of moisture into the lower portion of the sleeve member, and means for releasably securing said plunger in depressed position with said flange in sealing engagement with said top edge.

RAYMOND L. DEAL.

References Cited in the file of this patent

UNITED STATES PATENTS

| Number | Name | Date |
|---|---|---|
| 253,456 | Whitcomb | Feb. 7, 1882 |
| 965,989 | Coller | Aug. 2, 1910 |
| 1,212,388 | Ojerholm | Jan. 16, 1917 |
| 2,110,420 | Hill | Mar. 8, 1938 |
| 2,180,749 | Trubshaw | Nov. 21, 1939 |
| 2,439,451 | Clark | Apr. 13, 1948 |